US011710155B2

(12) United States Patent
Poehler (10) Patent No.: US 11,710,155 B2
(45) Date of Patent: *Jul. 25, 2023

(54) SYSTEM AND METHOD FOR GENERATING TEXT-BASED ADVERTISEMENTS

(71) Applicant: Miles Poehler, St. Paul, MN (US)

(72) Inventor: Miles Poehler, St. Paul, MN (US)

(*) Notice: Subject to any disclaimer, the term of this patent is extended or adjusted under 35 U.S.C. 154(b) by 47 days.

This patent is subject to a terminal disclaimer.

(21) Appl. No.: 17/397,534

(22) Filed: Aug. 9, 2021

(65) Prior Publication Data

US 2021/0366002 A1    Nov. 25, 2021

Related U.S. Application Data

(63) Continuation of application No. 16/460,613, filed on Jul. 2, 2019, now Pat. No. 11,087,367.

(Continued)

(51) Int. Cl.
*G06Q 30/02* (2023.01)
*G06Q 30/0241* (2023.01)
(Continued)

(52) U.S. Cl.
CPC ....... *G06Q 30/0276* (2013.01); *G06F 40/174* (2020.01); *G06F 40/186* (2020.01); *G06Q 30/018* (2013.01)

(58) Field of Classification Search
CPC .. G06Q 30/02; G06Q 30/0276; G06Q 30/018; G06Q 30/0254; G06Q 10/067;
(Continued)

(56) References Cited

U.S. PATENT DOCUMENTS 7,062,706 B2   6/2006  Maxwell et al.
7,865,394 B1   1/2011  Calloway et al.
(Continued)

FOREIGN PATENT DOCUMENTS

CA   2668629 C  * 12/2009  ............ G06Q 30/02
CA   2668629 C    2/2019
KR   10-1167410 B1 * 8/2012 ............ G06Q 50/10

OTHER PUBLICATIONS

Kanyawee Pornsawangdee; Unchalisa Taetragool, Pattern Recognition of Effective Online Classified Advertisement (English), 2019 IEEE 2nd International Conference on Knowledge Innovation and Invention (ICKII) (pp. 429-432), Jul. 1, 2019 (Year: 2019).*

(Continued)

*Primary Examiner* — Marilyn G Macasiano
(74) *Attorney, Agent, or Firm* — Merchant & Gould P.C.

(57) ABSTRACT

Described herein is a method and system for generating product descriptions of vehicles. A request for a customized vehicle publication is received, which includes at least a vehicle type, a set of standard features, and a set of optional features. One or more story templates associated with the vehicle type input are automatically received, where each of the story templates have populatable fields corresponding to the vehicle type, the set of standard features, and the set of optional features. The story templates have a theme correlated to usage of a vehicle having the vehicle type. A selection of a story template is received, and the vehicle characteristics are automatically populated. The completed vehicle product description is then provided.

15 Claims, 8 Drawing Sheets

Related U.S. Application Data (60) Provisional application No. 62/698,499, filed on Jul. 16, 2018.

(51) Int. Cl.
*G06Q 30/018* (2023.01)
*G06F 40/174* (2020.01)
*G06F 40/186* (2020.01)

(58) Field of Classification Search
CPC ............ G06Q 30/0246; G06Q 30/0207; G06F 40/174; G06F 40/186
See application file for complete search history.

(56) References Cited

U.S. PATENT DOCUMENTS

| | | |
|---|---|---|
| 8,006,261 B1 | 8/2011 | Haberman et al. |
| 9,135,292 B1 | 9/2015 | Tsun et al. |
| 9,183,569 B1 * | 11/2015 | Anderson .......... G06Q 30/0276 |
| 9,508,092 B1 | 11/2016 | Desoto et al. |
| 9,754,293 B1 * | 9/2017 | Wingle .............. G06Q 30/0241 |
| 10,037,317 B1 * | 7/2018 | Kaeser .................... G06F 40/56 |
| 10,235,391 B2 * | 3/2019 | Hoffman ................. G06F 16/21 |
| 2006/0074748 A1 | 4/2006 | Kline et al. |
| 2009/0030774 A1 | 1/2009 | Rothschild et al. |
| 2009/0089838 A1 | 4/2009 | Pino, Jr. et al. |
| 2009/0100362 A1 | 4/2009 | Sauve et al. |
| 2011/0196748 A1 * | 8/2011 | Caron ................ G06Q 30/0276 |
| | | 715/764 |
| 2014/0059415 A1 | 2/2014 | Bailey |
| 2014/0180834 A1 * | 6/2014 | Baum ................ G06Q 30/0276 |
| | | 705/14.72 |
| 2015/0143413 A1 * | 5/2015 | Hall ................... H04N 21/4667 |
| | | 725/34 |
| 2018/0012258 A1 * | 1/2018 | Walker .............. G06Q 30/0242 |

OTHER PUBLICATIONS

Krawcke, Nicole, Manufacturer marketing built for contracting success: loyalty programs, advertising templates simplify contractor marketing efforts, Air Conditioning, Heating & Refrigeration News 257.5: 11 (2). BNP Media. (Feb. 1, 2016), vol. 257, Issue: 5 (Year: 2016).

* cited by examiner

Dealership: [Park_Chrysler_Jeep ▼]
Incentive Program Eligible? ☐

404

One Owner/Accident Free: [accident_free ▼]

402

Year: [_2019 ▼] Make: [Jeep ▼] Model: [Cherokee ▼] Trim: [Overland]

COLORS
Exterior Color: [orange ▼] Interior Color [black ▼]

406

FEATURES
Specialty Features: [SELECT ▼]
Feature 1: [bluetooth ▼]
Feature 2: [rearview_camera ▼]
Feature 3: [heated_front_and_back_seats ▼]

406

OPTIONS
Certified: ☐
4WD/AWD: ☑
ABS: ☑
Convertible: ☐
Turbo: ☐
Rare: ☐
Exceptional Pictures ☐
Parrot Aftermarket Accessory: ☐

Model Type [ ▼]

[Find Template Matches!]

Feature 3: [heated_front_and_back_seats ▽] [                    ]

OPTIONS
Certified:                          ☐
4WD/AWD:                            ☑
ABS:                                ☑
Convertible                         ☐
Turbo                               ☐
Rare:                               ☐
Exceptional Pictures                ☐
Parrot Aftermarket Accessory:       ☐

Model Type [ ▽]
                                        502

[Find Template Matches]

| 1 | Jeep Went Overboard | Jeep, TrimContainsoverland | 44 | 356 |
| 2 | Tough as the Cherokee People | Jeep, Cherokee OR GrandCherokee | 34 | 113 |
Select a Template!
| 2 | Don't Cheap Out—Jeep Out | Jeep | 14 | 243 |
| 1 | It Cannot Get More Patriotic | USA | 12 | 15 |
| 3 | I Remember This Year Like It Was Yesterday | AgeLessThan 0 | 8 | 108 |
| 2 | I Howard Hughes | AgeLessThan 3 | 8 | 199 |

[Copy]

The folks at Jeep
really went Overboard
for this fantastic
ACCIDENT FREE
2019 Jeep Cherokee
Overland! Orange on      504
Black, these features
are loaded up Over-
under Bluetooth,
backup camera,
heated front and back
seats, and

SYSTEM AND METHOD FOR GENERATING TEXT-BASED ADVERTISEMENTS

PRIORITY

This application is a continuation of U.S. patent application Ser. No. 16/460,613, filed Jul. 2, 2019, which claims priority to U.S. Provisional Patent Application No. 62/698,499, filed Jul. 16, 2018, the disclosure of which are hereby incorporated by reference in their entirety.

TECHNICAL FIELD

The present disclosure relates generally to computer-based systems and methods, including computer programs for generating advertisements.

BACKGROUND

It is commonly known to use prewritten prose, such as sentences and paragraphs, to convey a message. These messages can be semi-customized by the user, such as including specific colors, names, numbers, and other similar items. However, the rest of the prose is pre-written and applicable to a variety of different situations.

Conventional advertisements generally include a list of product features or a paragraph of listed features, without any additional prose. These advertisements appear inconsistent, dry, and not cohesive. Conventional non-advertisement story generators use many pre-written story pieces that are composed of individual sentences combined into a single paragraph. Often, these paragraphs appear as if they have been written by a computer.

In order to overcome this, writers individually write and review each advertisement, which is time consuming. This process often requires writers to research the product being sold, gather the pertinent information, and then draft the individual advertisement. This is especially time consuming for advertisements for cars, including used cars, which are often in differing conditions.

SUMMARY

In accordance with the following disclosure, a method of generating product descriptions of vehicles is provided. The method includes receiving, at a software tool implemented on a computing system, a request for a customized vehicle publication. The request includes inputs describing vehicle characteristics including a vehicle type, a set of standard features, and a set of optional features. One or more story templates associated with the vehicle type input from among a plurality of existing story templates are automatically identified. Each of the plurality of existing story templates have populatable fields corresponding to the vehicle type, the set of standard features, and the set of optional features. The one or more story templates have a theme correlated to usage of a vehicle having the vehicle type. A selection of a story template from among the one or more story templates is received. The vehicle characteristics are automatically inserted within the populatable fields of the story template to generate a completed vehicle product description. The completed vehicle product description is provided in response to the request for the customized vehicle publication.

In an example aspect, a system for generating product descriptions of vehicles is described. The system includes a computing system including one or more computing devices and includes at least one processor communicatively connected to a memory, the memory configured to store instructions, which, when executed, cause the computing system to perform the following steps, when a request for a customized vehicle publication is received. The request includes inputs describing vehicle characteristics including a vehicle type, a set of standard features, and a set of optional features. One or more story templates associated with the vehicle type input from among a plurality of existing story templates are automatically identified. Each of the plurality of existing story templates have populatable fields corresponding to the vehicle type, the set of standard features, and the set of optional features. The one or more story templates have a theme correlated to usage of a vehicle having the vehicle type. A selection of a story template from among the one or more story templates is received. The vehicle characteristics are automatically inserted within the populatable fields of the story template to generate a completed vehicle product description. The completed vehicle product description is provided in response to the request for the customized vehicle publication.

In another example aspect, a system architecture for generating product descriptions of vehicles is described and includes the following components. A computing system comprising at least one processor is communicatively connected to a memory. The memory stores computer-executable instructions including an application programming interface (API). The system architecture includes a means for identifying one or more story templates associated with the vehicle type input. The story templates are selected from among a plurality of existing story templates, each of the plurality of existing story templates have populatable fields corresponding to the vehicle type, the set of standard features, and the set of optional features. The one or more story templates have a theme correlated to usage of a vehicle having the vehicle type. The system architecture also includes a means for receiving a selection of a story template from among the one or more story templates; a means for inserting the vehicle characteristics within the populatable fields of the story template to generate a completed vehicle product description; and a means for providing the completed vehicle product description in response to the request for the customized vehicle publication.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments for the appended claims.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

An object of the present invention is to create relevant advertisements that are cohesive, readable, and engaging. It is also an object of the present invention to create a system that is quick to use and requires minimal user input. Throughout the specification, reference is made to vehicles, namely personal cars; however, other types of vehicles such as tractors, boats, motorcycles, and other similar things are usable with the system.

Figure 1:
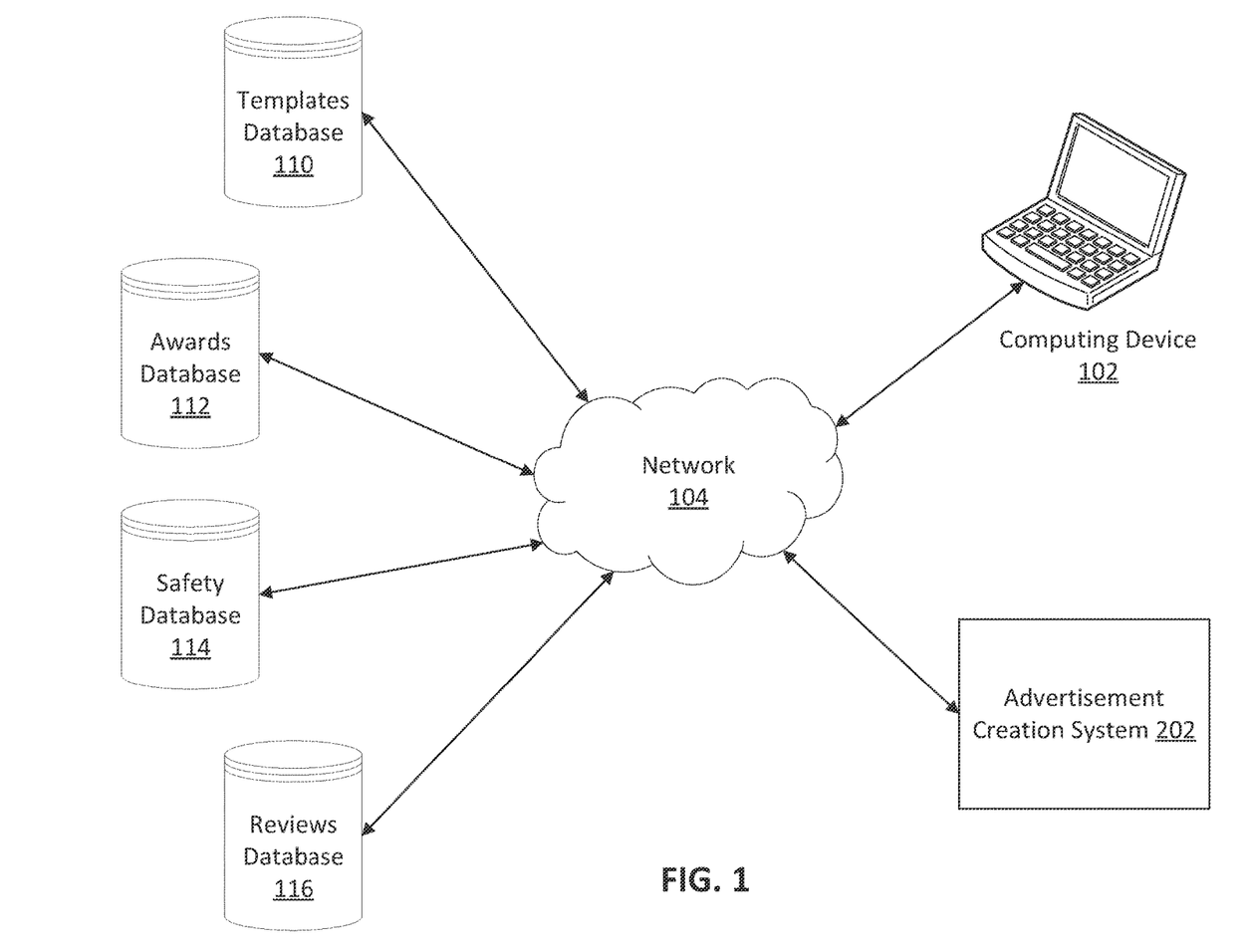
FIG. 1 illustrates an environment of generating a product description of a vehicle.

FIG. 1 illustrates an example environment 100 for generating product descriptions of vehicles. A user device 102 is in communication with a plurality of databases and an advertisement creation system 202 via a network 104. The plurality of databases include a templates database 110, an awards database 112, a safety database 114, and a reviews database 116. In other embodiments, more or less databases may be in communication with the advertisement creation system 202 and/or user device 102.

A templates database 110 includes a plurality of story templates. Each story template is drafted for at least a specific vehicle make and model. The story templates also have a theme that is correlated to the usage of the vehicle make and model. The story templates are then tagged so the story template is only provided for the specific vehicle make and model. The story templates are generally written as paragraph blocks. The story templates have a plurality of dynamic populatable blanks, which are filled in by inputs, such as the vehicle characteristics including a vehicle type, a set of standard features, and a set of optional features.

An awards database 112 maintains awards that a specific vehicle make, model, and year has received. The awards database 112 can be updated as needed, for example, when a vehicle receives a new award.

A safety database 114 maintains safety information for each of the vehicle make, model, and year. The safety database 114 can store safety information obtained from multiple different sources, such as the Insurance Institute for Highway Safety (IIHS), the European New Car Assessment Programme (Euro NCAP), the New Car Assessment Program for Southeast Asian Countries (ASEAN NCAP), and other similar sources.

A reviews database 116 maintains review information obtained from a plurality of sources. For example, review information may be obtained from professional review sources, such as Edmunds, Kelley Blue Book, and Consumer Reports. Review information may also be obtained from other sources, such as individual personal reviews. In an example, the reviews database 116 passes this information to the advertisement creation system 202. In another example, the reviews database 116 aggregates this information and generates an aggregate score, based on at least, the source of the review and the score of the review.

Figure 2:
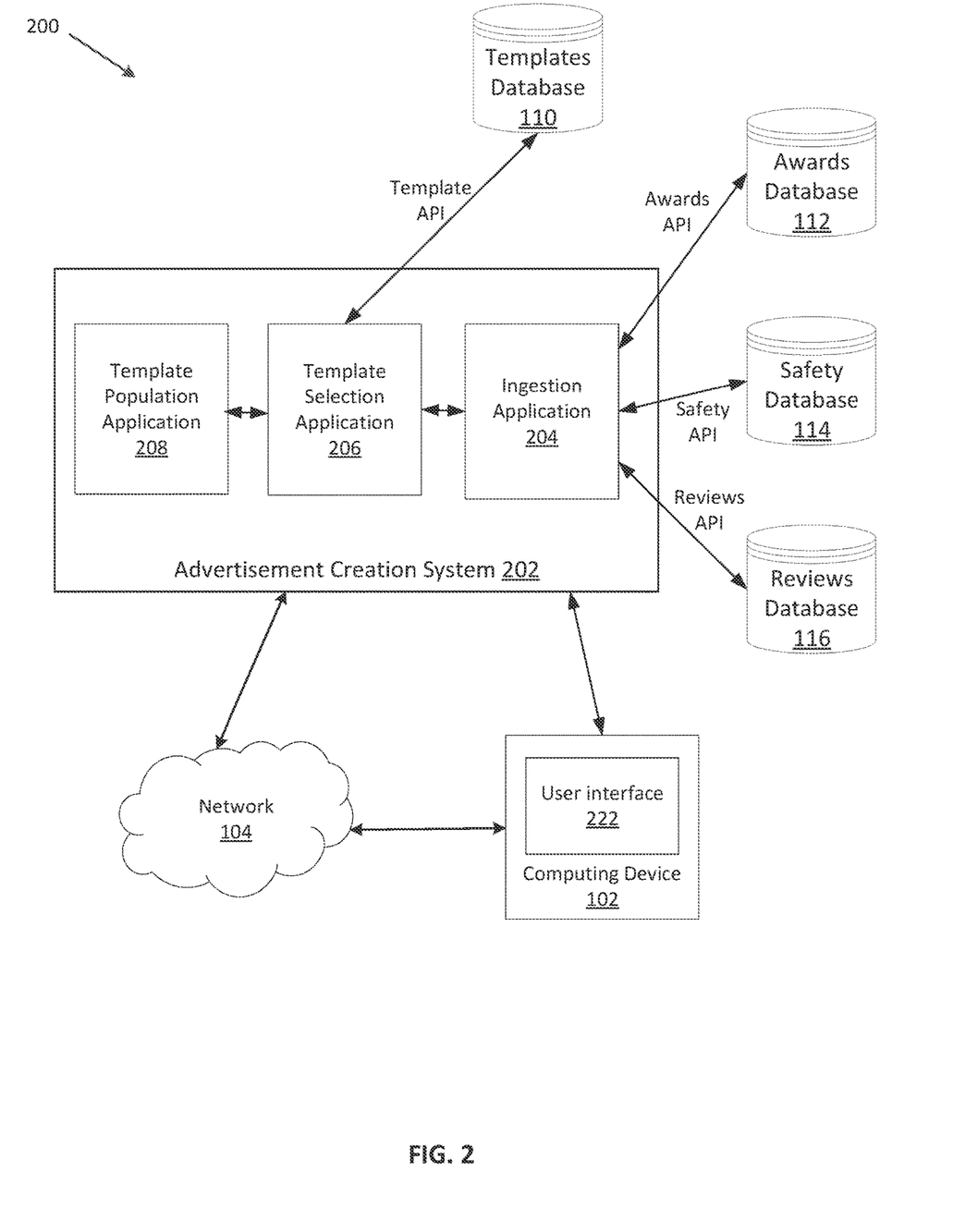
FIG. 2 illustrates a block diagram of a system architecture.

FIG. 2 illustrates a schematic diagram of an example system 200 for implementing an advertisement creation system 202. The advertisement creation system 202 can be implemented in the form of a software tool executable on a computing device, such as the device seen in FIG. 8. Components of the advertisement creation system 202 include an ingestion application 204, template selection application 206, and a template population application 208.

The ingestion subsystem receives inputs from a computing device 102 and a set of databases, such as the databases 112, 114, 116. A set of inputs, such as inputs describing vehicle characteristics including a vehicle type, a set of standard features, and a set of optional features are received from a computing device 102. The awards inputs are received by an awards database 112, which is called by an awards API after receiving a request from the ingestion application 204. The safety inputs are received by a safety database 114, which is called by a safety API after receiving a request from the ingestion application 204. The reviews inputs are received by a reviews database 116, which is called by a reviews API after receiving a request from the ingestion application 204.

A user, via a computing device 102 inputs vehicle characteristics to ingestion application 204. When a user desires to have a product description of a vehicle created, a user inputs the information, such as the vehicle characteristics including a vehicle type, a set of standard features, and a set of optional features on a user interface 222 on the computing device 102.

Vehicle characteristic inputs include a vehicle type, a set of standard features, and a set of optional features. Vehicle type inputs are defined as the year, make, and model of the vehicle. Standard features may include vehicle color, trim level, mileage, drivetrain, engine, transmission, fuel type, and body style. However, this list is not to be seen as exclusive.

Optional features include interior color, seat material, radio features, stereo features, backup camera, climate control, cruise control, storage, remote control access, dimming mirrors, towing capacity, power brakes, Bluetooth capabilities, wheel size, headlight type, moonroof/sunroof, airbags, power seats, console screen, cup holders, alarm system, child locks, seat type, traction control, power wipers, heated mirrors, daytime running lights, and all-wheel drive. However, this list is not be seen as exclusive.

In another embodiment, the set of standard features and the set of optional features are received from a third party database, such as the manufacturers' website.

Awards inputs are defined as awards received from third party sources. The awards are retrieved from the awards database 112 that maintains awards that a specific vehicle make, model, and year has received.

Safety inputs are defined as safety awards received from third party sources. The safety inputs may be retrieved from the safety database 114, which includes safety information obtained from multiple different sources, such as the Insurance Institute for Highway Safety (IIHS), the European New Car Assessment Programme (Euro NCAP), the New Car Assessment Program for Southeast Asian Countries (ASEAN NCAP), and other similar sources. Safety inputs could also include safety features, such as airbags, anti-lock brakes, and other similar features.

Reviews inputs are defined as reviews of the car received from third party sources. For example, review information may be obtained from professional review sources, such as Edmunds, Kelley Blue Book, Consumer Reports, and reviews from individual people.

In response to receiving the inputs, ingestion application 204 provides the information to the template selection application 206. A plurality of story templates are received by a templates database 110, which is called by a template API after receiving a request from the template selection application 206. In a first embodiment, the template selection application 206 identifies one or more story templates associated with the inputs received from the ingestion application 204 and presents the options to a user for selection of one story template. In another embodiment, the template selection application 206 selects a story template.

Story templates are selected to match a theme correlated to a usage of the vehicle type. For example, a van may have a template theme related to soccer. In another example, a sports car may have a theme related to car racing. In yet another example, a truck may have a template theme related to moving or transporting boxes. Still further, themes may be related to the vehicle color, and/or one of the standard features, such as a convertible.

When the template selection application 206 identifies one or more story templates and presents the one or more story templates to a user for selection, a user may be presented with the story template options on the user interface 222. The user may be able to preview different story templates on the user interface 222, and then the user is able to select one of the story templates.

After one story template is selected, the template population application 208 populates the populatable fields within the story template. The populatable fields are populated with the vehicle characteristic inputs to generate a completed vehicle product description. If the story template includes a populatable field corresponding to an input that is not applicable or received by the ingestion application 204, the template population application 208 removes the text associated with the un-populated field. In an alternative embodiment, the template population application 208 highlights the un-populated field, so the user is notified of a blank field.

The template population application 208 then provides a completed vehicle product description to a user interface 222 of a connected computing device 102 via the network 120. The user interface 222 can be viewed by a user of the advertisement creation system 202 for implementation.

In a further embodiment, the advertisement creation system 202 publishes the completed vehicle product description to a website. For example, a user may specify which website or destination location the completed vehicle product description is to be published at.

The advertisement creation system 202 communicates with the computing device 102 through a network 120. The network 120 can be any of a variety of types of public or private communications networks, such as the Internet. The computing device 102 can be any network-connected device including desktop computers, laptop computers, tablet computing devices, smartphones, and other devices capable of connecting to the Internet through wireless or wired connections.

Figure 3:
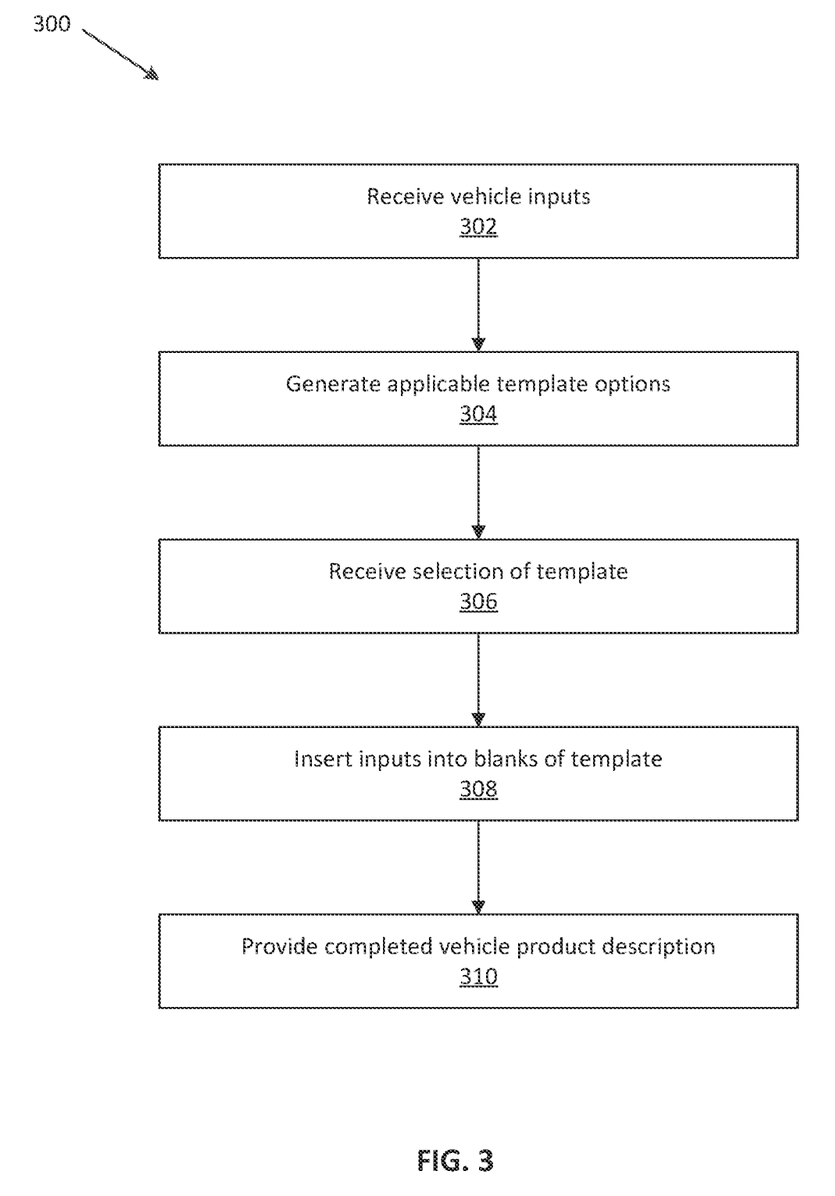
FIG. 3 illustrates a method of generating a vehicle description.

FIG. 3 illustrates an example method 300 of generating product descriptions of vehicles. These product descriptions are often used as part of an advertisement to sell the vehicle. At operation 302, a set of vehicle inputs is received. The set of vehicle inputs is selected from at least a vehicle type, set of standard features, and a set of optional features. A vehicle type includes the year, the make, and the model of the vehicle. Alternatively, the VIN may be provided and information associated with the VIN is retrieved. Standard features are selected from features that further define the vehicle type, such as trim level. Other standard features are defined above. Optional features are additional features that a vehicle may possess. Other optional features are also described above. Other inputs include awards associated with the vehicle, safety information, and reviews of the vehicle.

At operation 304, applicable story template options are generated. Applicable story templates are related to the vehicle type and have a theme correlated to the usage of a vehicle having the same vehicle type. A theme is a story that matches a preconceived notion of the vehicle type or a stereotype of the vehicle. Themes are generated to grab a reader's attention and may include colorful language and/or attention grabbing introductions. At least one story template correlating to the theme is presented to a user for selection.

At operation 306, the selection of a story template is received. After presenting at least one story template to the user, a user selects the story template they desire to use in the completed vehicle product description. Alternatively, the story template is selected automatically.

At operation 308, the inputs are inserted into the blanks of the template. The inputs including the vehicle type, the standard features, the optional features, and any additional inputs are populated within the populatable fields of the story template. In an embodiment, all the inputs are inserted into fields. In another embodiment, not all inputs are inserted into the populatable fields. Still further, prose associated with a blank field is removed or highlighted.

At operation 310, the completed vehicle product description is provided to the user. In a further embodiment, the completed vehicle product description may include at least one photo of the vehicle.

Figure 4:
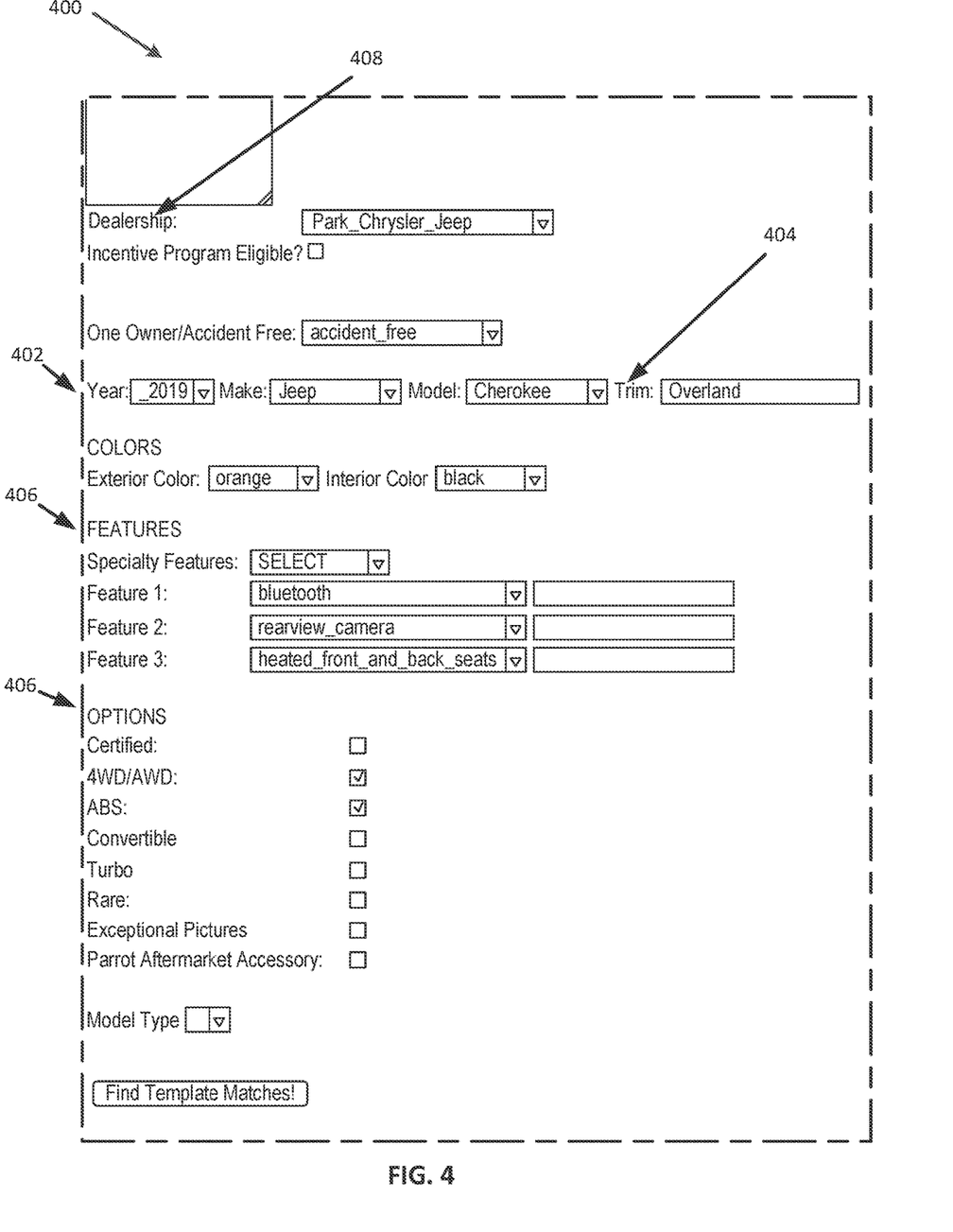
FIG. 4 illustrates an example user interface of a vehicle description generator.

FIG. 4 illustrates an example user interface 400 for selecting the vehicle type 402, standard features 404, and optional features 406. The interface 400 also includes other inputs 408, such as the owner (in this example, a dealership). The user interface 400 is presented to a user for selection. Once the user has entered in the applicable information, at least one story template option is generated and presented to the user.

Figure 5:
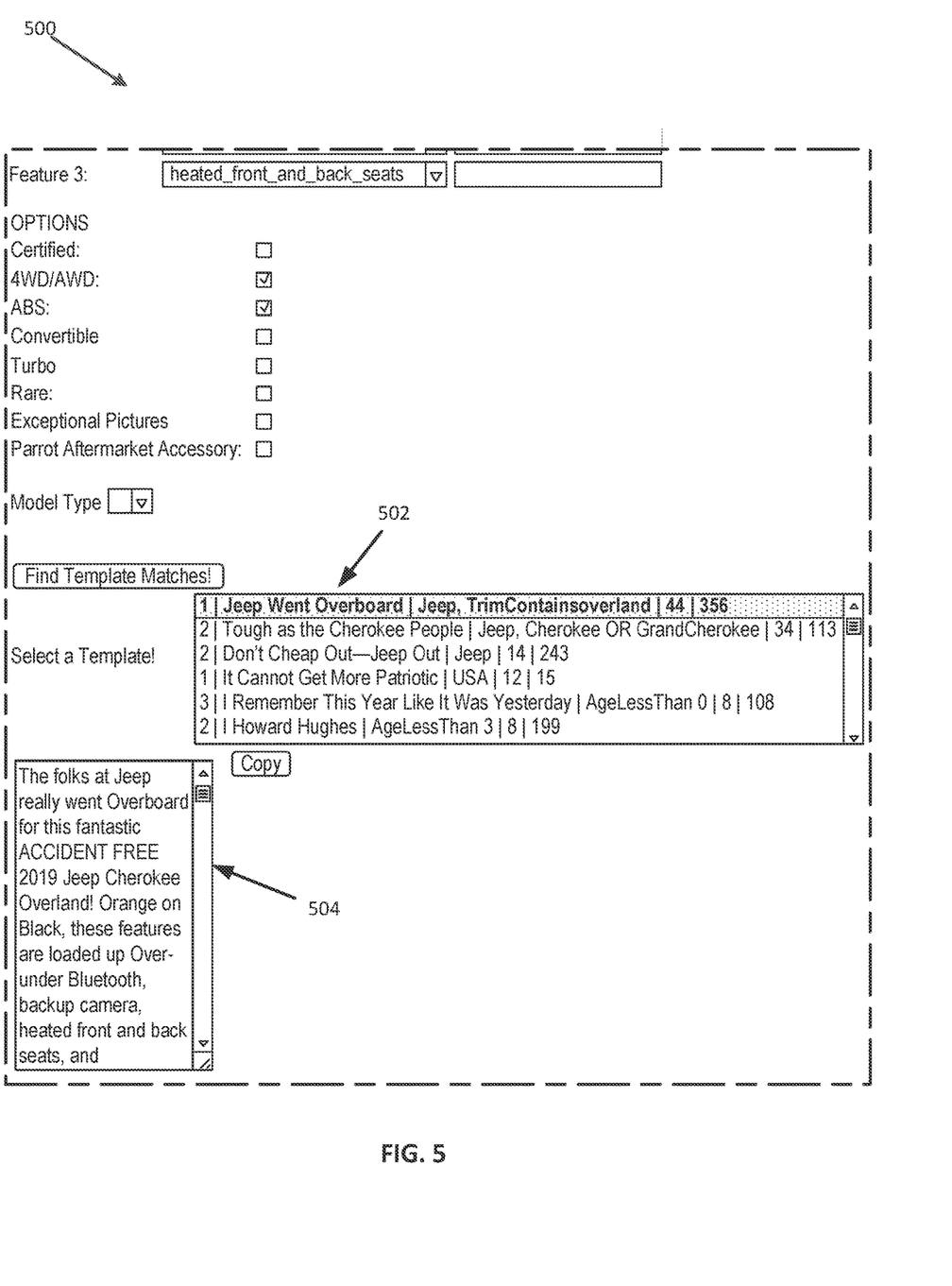
FIG. 5 illustrates an example user interface of a vehicle description generator.

FIG. 5 illustrates an example user interface 500 of story template options 502 and a preview 504 of a selected story template. The plurality of story template options 502 are retrieved from the story templates database 110. The story template options 502 are selected based on the vehicle make and model. In an example, a user is able to preview the story templates with the information provided in the inputs.

Figure 6:
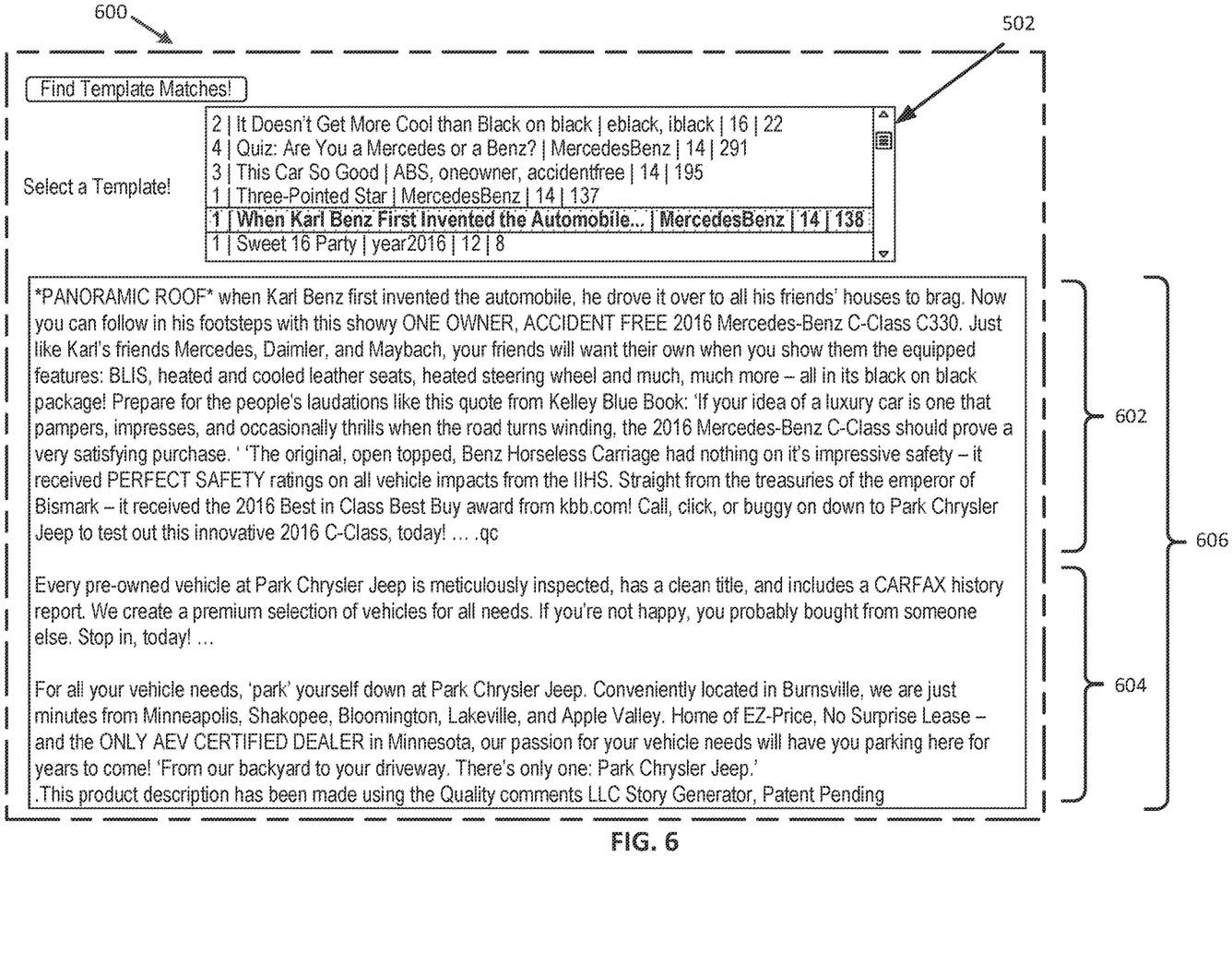
FIG. 6 illustrates an example user interface of a vehicle description generator.

FIG. 6 illustrates an example user interface 600 of a preview of a completed vehicle product description 606. The user interface 600 includes a list of story template options 502. After a user has selected a story template, the story template is populated to generate a finalized template 602.

The completed vehicle product description 606 includes at least the finalized template 602 and optional seller information 604. The completed vehicle product description 606 may also include other parts, such as photos of the vehicle.

Figure 7:
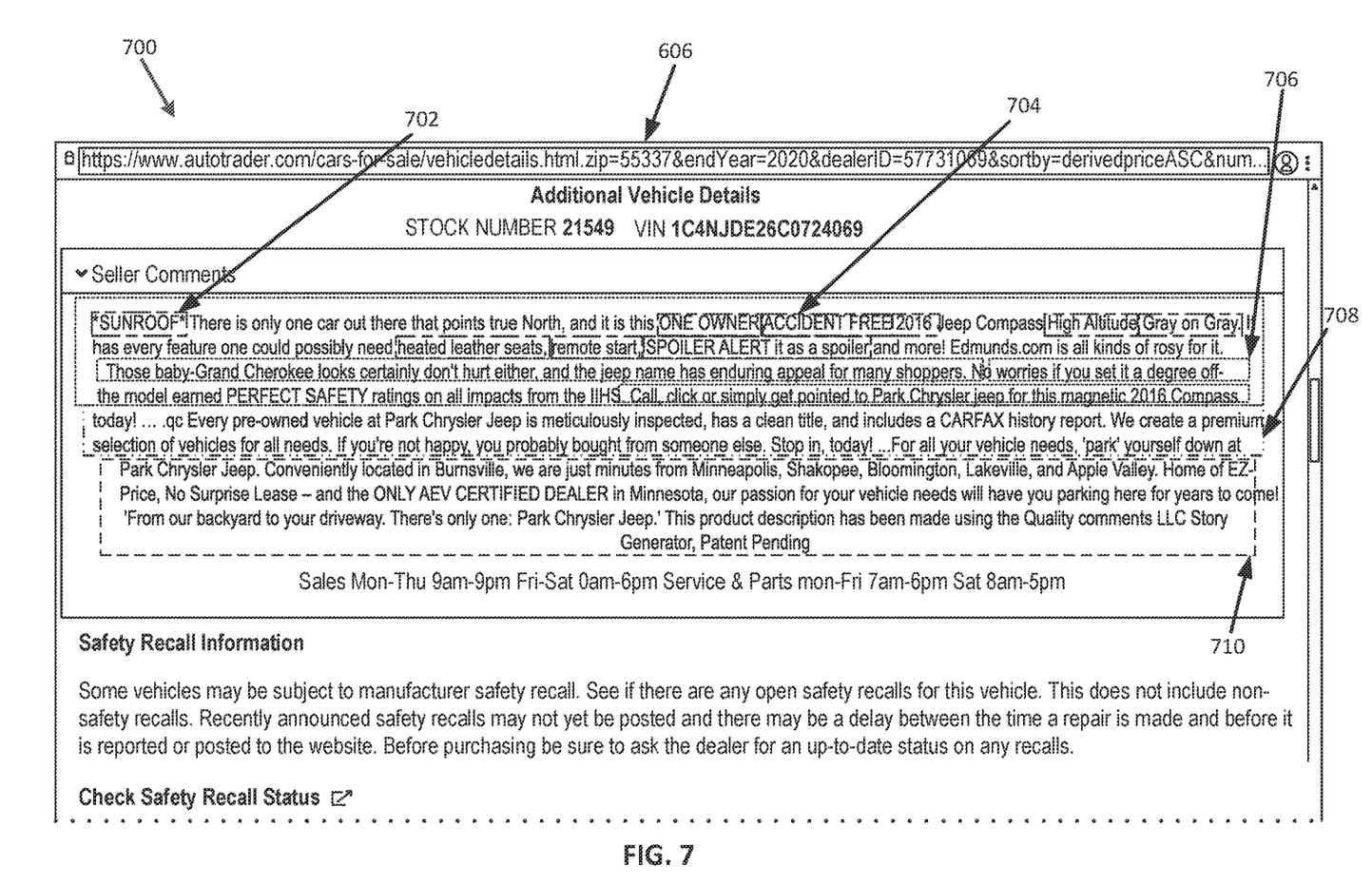
FIG. 7 illustrates an example user interface of a vehicle description generator.

FIG. 7 illustrates a user interface 700 of an annotated completed vehicle product description 606. The completed vehicle product description 606 includes at least, populatable fields populated with the application inputs. Populatable field 702 is associated with an optional feature, for example, a sunroof. Populatable field 704 is associated with vehicle history. Populatable field 706 is associated with safety awards. Populatable field 708 includes seller information, such as the location of the seller. Populatable field 710 is associated with the standard features and/or optional features that were not populated elsewhere in the completed vehicle product description 606.

Figure 8:
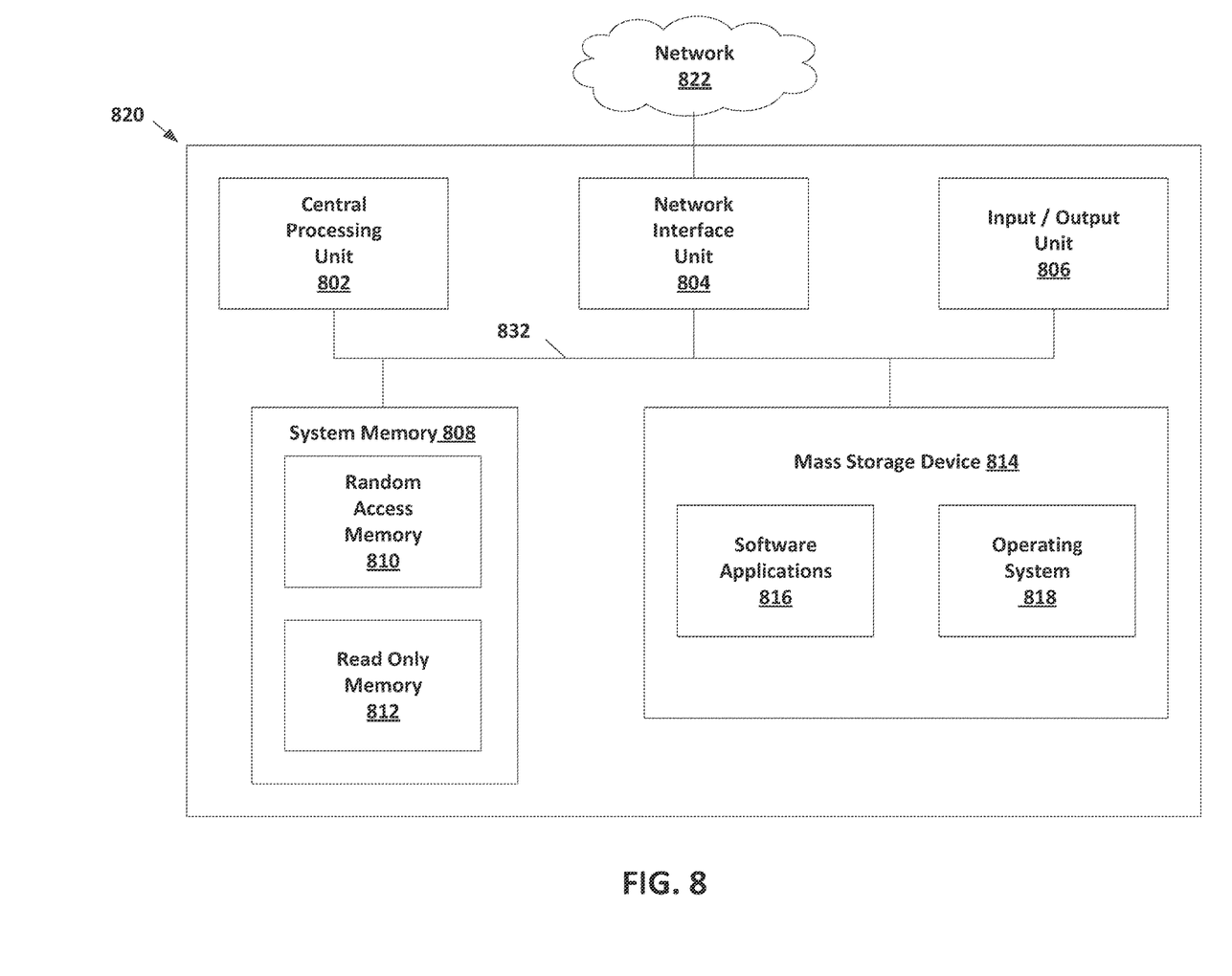
FIG. 8 illustrates an example block diagram of a computing system for generating a vehicle product description.

Referring now to FIG. 8, an example block diagram of a computing system 820 is shown that is useable to implement aspects of the transportation vessel management system 202 of FIG. 2. In the embodiment shown, the computing system 820 includes at least one central processing unit ("CPU") 802, a system memory 808, and a system bus 832 that couples the system memory 808 to the CPU 802. The system memory 808 includes a random access memory ("RAM") 810 and a read-only memory ("ROM") 812. A basic input/output system that contains the basic routines that help to transfer information between elements within the computing system 820, such as during startup, is stored in the ROM 812. The computing system 820 further includes a mass storage device 814. The mass storage device 814 is able to store software instructions and data.

The mass storage device 814 is connected to the CPU 802 through a mass storage controller (not shown) connected to the system bus 832. The mass storage device 814 and its associated computer-readable storage media provide non-volatile, non-transitory data storage for the computing system 820. Although the description of computer-readable storage media contained herein refers to a mass storage device 814, such as a hard disk or solid state disk, it should be appreciated by those skilled in the art that computer-readable data storage media can include any available tangible, physical device or article of manufacture from which the CPU 802 can read data and/or instructions. In certain embodiments, the computer-readable storage media comprises entirely non-transitory media.

Computer-readable storage media includes volatile and non-volatile, removable and non-removable media implemented in any method or technology for storage of information, such as computer-readable software instructions, data structures, program modules, or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 820.

According to various embodiments of the invention, the computing system 820 may operate in a networked environment using logical connections to remote network devices through a network 822, such as a wireless network, the Internet, or another type of network. The computing system 820 may connect to the network 822 through a network interface unit 804 connected to the system bus 832. It should be appreciated that the network interface unit 804 may also be utilized to connect to other types of networks and remote computing systems. The computing system 820 also includes an input/output controller 806 for receiving and processing input from a number of other devices, including a touch user interface display screen or another type of input device. Similarly, the input/output controller 806 may provide output to a touch user interface display screen or other type of output device.

As mentioned briefly above, the mass storage device 814 and the RAM 810 of the computing system 820 can store software instructions and data. The software instructions include an operating system 818 suitable for controlling the operation of the computing system 820. The mass storage device 814 and/or the RAM 810 also store software instructions, that when executed by the CPU 802, cause the computing system 820 to provide the functionality discussed in this document. For example, the mass storage device 814 and/or the RAM 810 can store software instructions that, when executed by the CPU 802, cause the computing system 820 to receive and analyze inventory and demand data.

In accordance with the present disclosure, and in particular with respect to the computing device disclosed in FIG. 8, it is noted that in some instances, rather than direct execution of software instructions on computing hardware, a virtualization system may be implemented that is configured to host and execute software instructions within a virtualized environment. In such instances, a portion of an enterprise-wide pool of computing systems may be allocated for execution of software instructions on an as-needed basis, e.g., for scaling to accommodate execution of simulations as discussed above for purposes of trailer fleet optimization. Additionally, such simulations may be performed concurrently on separately-allocated virtual machines to assist with parallelization of the process described above.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A method of generating product descriptions of items, the method comprising:
   receiving, at a software tool implemented on a computing system, a request for a customized publication, the request including inputs describing at least one item characteristic including an identification of an item for sale within the customized publication, wherein the item has a plurality of item characteristics determined based on the identification of the item that includes an item type, a set of standard features, and a set of optional features;

identifying one or more story templates associated with the item identification from among a plurality of existing story templates, each of the plurality of existing story templates having populatable fields corresponding to the item type, the set of standard features, and the set of optional features, the one or more story templates having a theme correlated to usage of the item;

receiving a selection of a story template from among the one or more story templates;

automatically inserting item characteristics within the populatable fields of the story template to generate a completed product description; and providing the completed product description in response to the request for the customized publication.

2. The method of claim 1, wherein the item comprises a vehicle, and the item type comprises a vehicle type including a year, make, and model.

3. The method of claim 1, wherein the set of standard features includes a color, trim level, mileage, drivetrain, engine, transmission, fuel type, and body style.

4. The method of claim 1, wherein when there is no corresponding input for a populatable field, the field is left blank in the completed product description.

5. The method of claim 1, wherein when there is no corresponding input for a populatable field, the field and associated prose is removed from the completed product description.

6. The method of claim 1, wherein the completed product description further comprises at least one photo.

7. The method of claim 1, wherein the set of optional features is received from a third party database.

8. A system for generating product descriptions of items, the system comprising:

a computing system including one or more computing devices and comprising at least one processor communicatively connected to a memory, the memory configured to store instructions which, when executed, cause the computing system to:

receive a request for a customized publication, the request including inputs describing item characteristics including an item type, a set of standard features, and a set of optional features;

automatically identify one or more story templates associated with the item type input from among a plurality of existing story templates, each of the plurality of existing story templates having populatable fields corresponding to the item type, the set of standard features, and the set of optional features, the one or more story templates having a theme correlated to usage of the item;

receive a selection of a story template from among the one or more story templates;

automatically insert the item characteristics within the populatable fields of the story template to generate a completed product description; and provide the completed product description in response to the request for the customized publication.

9. The system of claim 8, wherein the item comprises a vehicle, and the item type comprises a vehicle type including a year, make, and model.

10. The system of claim 8, wherein the set of standard features includes color, trim level, mileage, drivetrain, engine, transmission, fuel type, and body style.

11. The system of claim 8, wherein, when there is no corresponding input for a populatable field, the field is left blank in the completed product description.

12. The system of claim 8, wherein when there is no corresponding input for a populatable field, the field and associated prose is removed from the completed product description.

13. The system of claim 8, wherein the completed product description further comprises at least one photo.

14. The system of claim 8, wherein the set of optional features is received from a third party database.

15. A system architecture for generating product descriptions of items, the system comprising:

a computing system comprising at least one processor communicatively connected to a memory, the memory storing computer-executable instructions comprising an application programming interface (API);

means for identifying one or more story templates associated with an item type input from among a plurality of existing story templates, each of the plurality of existing story templates having populatable fields corresponding to the item type, a set of standard features, and a set of optional features, the one or more story templates having a theme correlated to usage of an item having the item type;

means for receiving a selection of a story template from among the one or more story templates;

means for inserting item characteristics within the populatable fields of the story template to generate a completed product description; and means for providing the completed product description in response to a request for a customized publication.

* * * * *